United States Patent
McKay, Sr.

[11] 3,766,653
[45] Oct. 23, 1973

[54] THREE AXIS INSPECTION PROBE

[75] Inventor: Russell M. McKay, Sr., Los Altos, Calif.

[73] Assignee: Lockheed Missiles & Space Company, Inc., Sunnyvale, Calif.

[22] Filed: Oct. 4, 1971

[21] Appl. No.: 186,231

[52] U.S. Cl. .......................................... 33/174 L
[51] Int. Cl. .......................... G01b 3/22, G01b 7/28
[58] Field of Search .............. 33/189, 174 L, 169 R, 33/23 K, 174 R, 174 P

[56] References Cited
UNITED STATES PATENTS

| 3,250,012 | 5/1966 | Hilton et al. ..................... 33/174 L |
| 3,520,063 | 7/1970 | Rethwish et al. .................. 33/174 L |
| 3,673,695 | 7/1972 | Rethwish .......................... 33/174 L |
| 3,571,934 | 3/1971 | Buck, Sr. .......................... 33/174 L |
| 3,660,906 | 5/1972 | Zimmerman ....................... 33/174 L |
| 2,395,525 | 2/1946 | Wilkie et al. ...................... 33/23 K |

Primary Examiner—Stanley N. Gilreath
Assistant Examiner—Jon W. Henry
Attorney—George C. Sullivan et al.

[57] ABSTRACT

A probe of the type used with automatic numerical control inspection systems for checking sizing of machined articles is disclosed. This probe measures dimensions along either of three axis to effect electrical signal indicative of any deviation from the nominal dimension. This probe has a spindle which rides against the plunger of an electric transducer. Movements in the Z direction are measured by retracting the shaft of the transducer by a movement of the spindle. Movement in the X and Y direction is measured by allowing the total stylus assembly to pivot, thus allowing the shaft of the transducer to extract.

7 Claims, 4 Drawing Figures

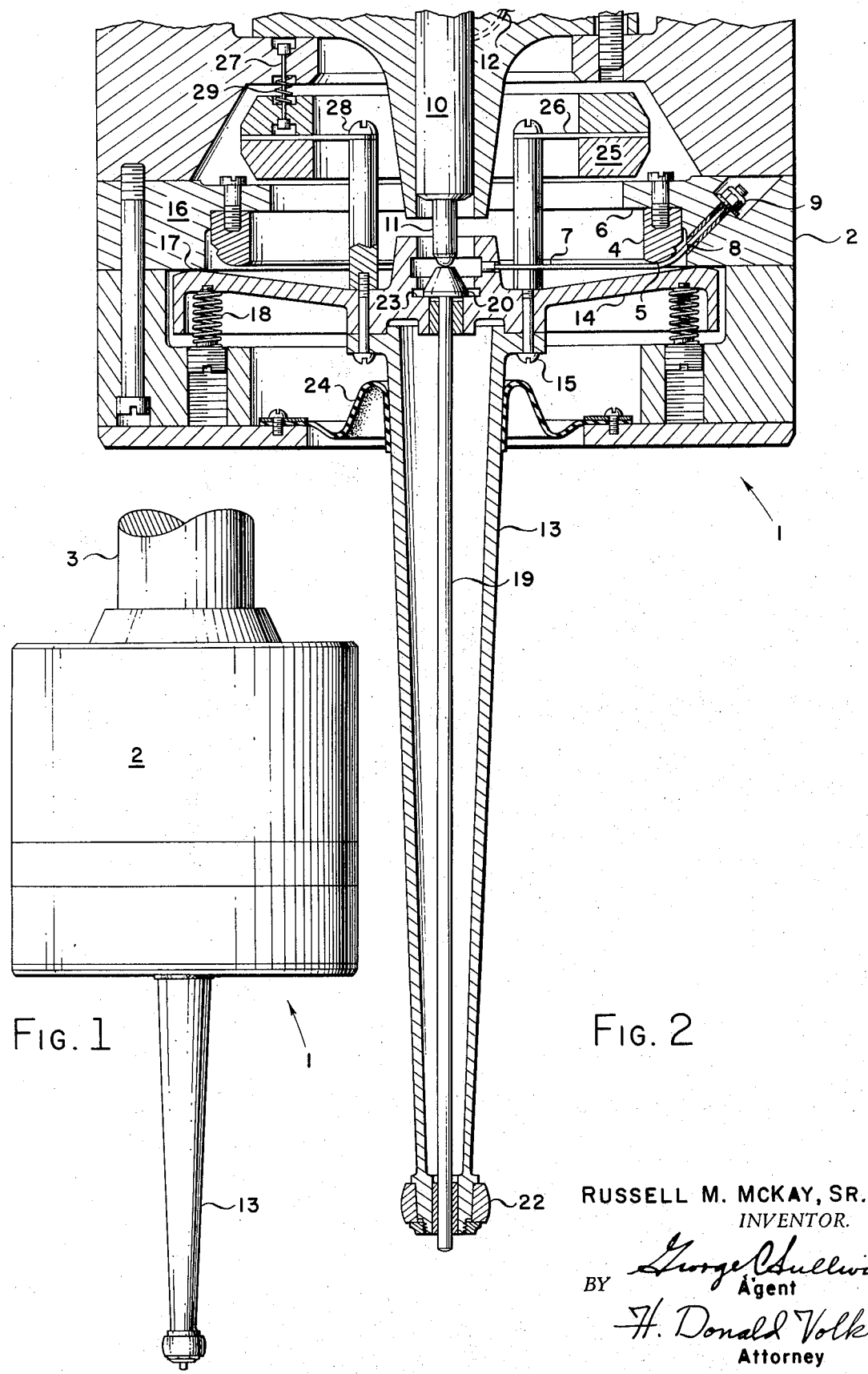

PATENTED OCT 23 1973 3,766,653

RUSSELL M. McKAY, SR.
*INVENTOR.*

BY George C Sullivan
*Agent*

H. Donald Volk
Attorney ured. Moreover, measurements
in the Z direction are made by displacing the stylus
shaft vertically which forces the translation cone in an
upward direction. Since horizontal and vertical displacements are both measured by urging the translation cone in the same direction, an external device for discriminating between these two measurements is necessary. All of these limitations are overcome by the present invention.

THREE AXIS INSPECTION PROBE

BACKGROUND OF THE INVENTION

This invention relates to inspection probes and more particularly to probes as used for inspecting machine parts on a numerically controlled machine.

It has long been a problem to efficiently and expeditiously inspect certain machined parts. Inspection in the past has been carried on using conventional surface plate methods. Here, the parts are inspected in all planes using deep throated micrometers, indicators and other devices having special extensions and often requires two men to perform the inspection. Such a method of inspection is not only very time consuming and lacks accuracy, but also leaves no permanent record of the points inspected.

The problem of inspecting dimensions of complex machine parts has been greatly simplified in recent years with the advent of numerically controlled (N/C) machines. The method by which inspections are performed on a numerical control machine is well known and basically involves a substitution of a probe in place of the tool and a spindle of the N/C machine. The machine is then actuated and driven over the machine part under influence of the inspection program. The probe is positioned at predetermined points of the machined part and errors or directions from the desired dimension can be detected.

One such technique is disclosed in U. S. Pat. No. 3,250,012 entitled "Inspection Device and Method". While the inspection probe described in that patent has been found to be a significant advance in the state of the art, it has certain limitations including the requirements for special procedures for making measurements along the Z axis.

Another technique is disclosed in U. S. Pat. No. 3,571,934 entitled "Three Axis Inspection Probe." While this inspection probe has been found to be a significant advance in the state of the art over the first mentioned patent, it still has certain limitations which are overcome by the present invention. Specifically, when measurements are being made in the X and Y direction by this prior art device, the stylus shaft pivots around a central spherical bearing, forcing the upper spherical surface of the stylus to be displaced from the center of the translation cone, which in turn urges the translation cone in an upward direction. Since the sliding of the spherical surface along the translation cone requires considerable force and causes considerable friction, a large force is exerted by the stylus against the work piece being meas

SUMMARY OF THE INVENTION

The present invention is directed to a three axis inspection probe adapted to be used on a numerical controlled machine. This probe has a spindle which rides against the plunger of an electric transducer. The spindle is mounted concentrically within a stylus assembly. The stylus assembly is held concentrically with the center of the transducer plunger by a plurality of suspension members and includes an annular ring. Proximate to the outer periphery of the annular ring is a line circular contact or point contact yoke which rides on an anvil formed in the housing. Movements in the Z direction are made by retracting the shaft of the transducer by movement of the spindle. Movements in the X and Y direction are measured by allowing the total stylus assembly to pivot at the point where the yoke meets the anvil, thus allowing the shaft of the transducer to extract. A plurality of balance springs urge the annular yoke against the annular anvil when no measurements are being taken. Counter weights keep the stylus from deflecting when it is used in a horizontal position.

BRIEF DESCRIPTION OF THE DRAWINGS

FIG. 1 is a prespective view of an inspection probe constructed in accordance with the invention.

FIG. 2 is a partial cross-sectional elevation and view of the inspection probe shown in FIG. 1 and constructed in accordance with the invention.

DESCRIPTION OF THE PREFERRED EMBODIMENT

Figure 3:
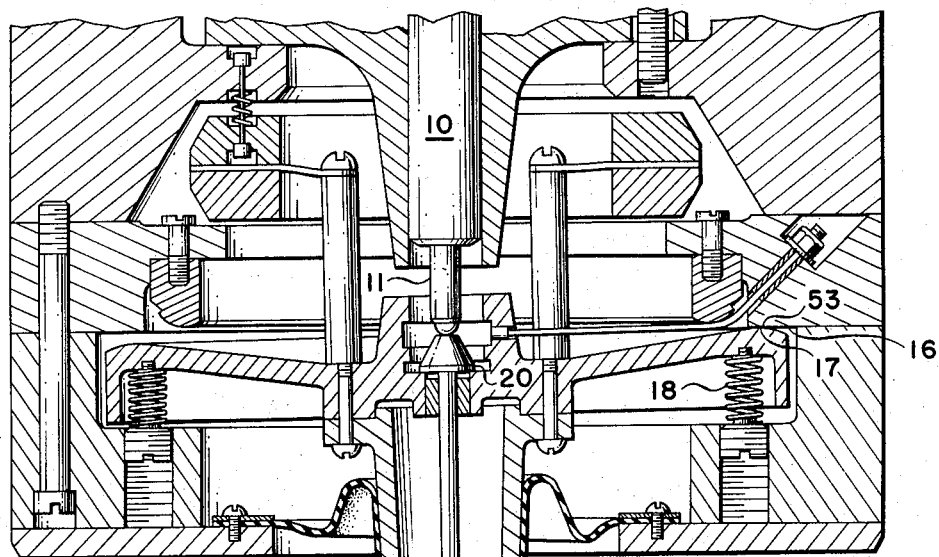
FIG. 3 is a schematic view of the apparatus of FIG. 1 showing the apparatus in the X-Y axis operating mode.

Referring to FIG. 1 and FIG. 2, the probe device 1 comprises a hollow cylindrical housing 2, the upper end of which is secured to a cylindrical shank 3 adapted to engage in the collet of a machine tool spindle (not shown). While the arbor or shank 3 shown is of a cylindrical configuration, other shapes adapted to engage a spindle may be substituted in a well known manner.

An annular ring 4 having a substantially convex surface 5 is mounted within cavity 6 of housing 2. A plurality of centering suspension wires 7 are adjustably inserted through tubular openings 8 in housing 2 and include an adjustment means such as nut 9. An electrical transducer 10 having an input spindle 11 and an electrical output line 12 is mounted in the housing 2 concentric with shank 3 by any well known means (not shown). An annular ring 14 is held concentric with transducer 10 by centering suspension wires 7 and extends from the housing 2.

Elongated stylus 13 is rigidly attached and held concentric with shank 3 and transducer 10 by annular ring 14 by any well known means such as studs 15. An annular anvil 16 is mounted within cavity 6 of housing 2. A line circular contact formed on the upper edge of annular ring 14 is in contact with annular anvil 16. A plurality of balance springs 18 urge the line circular contact 17 in contact with the annular anvil 16. An elongated spindle 19 which includes a cap 20 is mounted concentrically and axially slideable within the stylus 13 and annular ring 14 that form the stylus assembly. A probe contact 22 is mounted on the lower end of the elongated stylus 13.

Flexible rubber boot encloses the lower end of housing 2 and elongated stylus 13. The outer periphery of the boot 24 is secured to the housing 2 and the inner periphery is secured to the stylus 13. This arrangement prevents foreign matters from entering the device and interferring with the close tolerance parts.

A counter weight 25 is attached to annular ring 14 by a plurality of support spring members 26 and studs 28 and to housing 2 by a plurality of flexible cables 27. When the probe device 1 is used in the vertical position as shown, the counter weight is supported from the housing by the plurality of flexible cables 27. When the probe device 1 is used in the horizontal position, the counter weight 25 is supported by annular ring 14 by the plurality of support spring members 26 and studs 28 so that the weight of the counter weight 25 counterbalances the weight of the rest of the stylus assembly so that the measuring force exerted by the tip of the stylus 13 is uniform in all positions of measurement.

Figure 4:
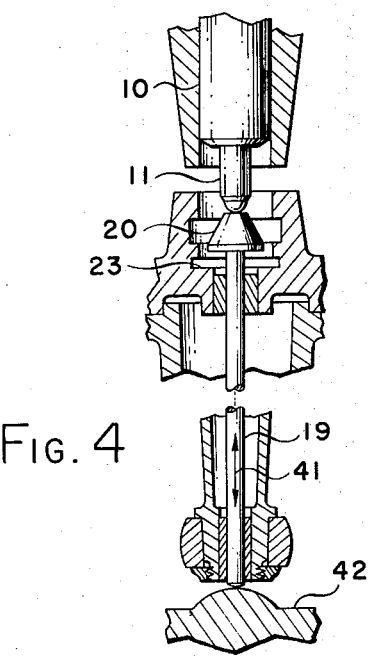
FIG. 4 is a view similar to FIG. 3 showing the apparatus in the axis operating mode.

Referring to FIG. 4, there is shown a first operating mode of the apparatus in which the spindle 19 is upwardly vertically displaced along the Z axis 41. In this mode the spindle 19 is displaced upwardly vertically by the workpiece, and in turn applying a upward vertical force on the input spindle 11 of transducer 10. As the inspection probe is moved away from the workpiece, input spindle 11 of transducer 10 is returned by transducer 10 to its original position which in turn pushes the elongated spindle 19 in a downward direction until cap member 20 is again seated on surface 23.

A second operating mode is illustrated in FIG. 3 showing the apparatus in the X-Y operating mode. As shown here, the probe contact 22 has laterally approached workpiece 52 in the direction of arrow 51. In this mode, when the probe contact 22 contacts the workpiece, the stylus assembly pivots around point 53 where the line circular contact 17 meets the annular anvil 16. This pivoting of the stylus assembly allows the input spindle 11 of electrical transducer 10 to extract. As the inspection probe is moved away from the workpiece, transducer spindle 11 is urged back to its original position by cap member 20 as the balance spring 18 restores the stylus assembly back in contact with the anvil.

In the foregoing description it will be seen that the present invention provides a convenient means for inspecting machine parts.

As will be appreciated by those skilled in the art, various modifications, omissions and additions may be used to the present invention without departing from the scope thereof. Accordingly, it is to be understood that the invention shall be limited only by the following claims.

I claim:

1. An inspection device adapted to be selectively positioned along three orthogonal axis relative to a workpiece for varifying the dimensions thereof, comprising:

a housing, a transducer means rigidly mounted in said housing, said transducer means includes an input shaft, an elongated stylus extending from said housing, resilient means for centering said elongated stylus concentric with said transducer input shaft, an annular anvil mounted in and rigidly affixed to said housing concentric with said transducer input shaft, an annular ring rigidly affixed to said elongated stylus, said annular ring extending transversely of said stylus and pivotably contacting said anvil, balance means extending between said annular ring and said housing and urging said annular ring against said anvil, an elongated spindle extending concentrically and axially slideable within said stylus and engaging said transducer input shaft, whereby deflections along two orthonogonal axis are measured by transversely deflecting said stylus and annular ring pivotably around any point where said ring engages said anvil thereby causing said transducer input shaft to extract, and deflections along the third orthogonal axis are measured by axially displacing said spindle thereby causing said transducer input shaft to retract.

2. An inspection device as defined in Claim 1 wherein said resilient means comprises a plurality of centering suspension wires.

3. An inspection device as defined in claim 2 wherein said balance means comprises a plurality of balance springs.

4. An inspection device as defined in claim 3 wherein said housing includes a shank, said shank rigidly affixed to said housing and adapted to engage the collet of a machine tool spindle.

5. An inspection device as defined in claim 4 wherein said shank is centered concentrically with said transducer shaft.

6. An inspection device as defined in claim 5 including a counterweight attached to said annular ring by a first support means and to said housing by second support means so that weight of the counterweight counterbalances the weight of the rest of the stylus assembly when the inspection device is in the horizontal position.

7. An inspection device as defined in claim 6 wherein said second support means comprises a plurality of flexible cables.

* * * * *